US012560207B1

(12) United States Patent
Hamrin

(10) Patent No.: US 12,560,207 B1
(45) Date of Patent: Feb. 24, 2026

(54) ROLLER SPRING MEMBERS FOR AN OVERRUNNING CLUTCH

(71) Applicant: TEAM Industries, Inc., Bagley, MN (US)

(72) Inventor: John Edward Hamrin, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 19/016,649

(22) Filed: Jan. 10, 2025

(51) Int. Cl.
 F16D 41/08 (2006.01)
 B60K 17/26 (2006.01)
 B60K 23/06 (2006.01)
 F16D 41/06 (2006.01)
 F16D 41/067 (2006.01)
 F16H 48/16 (2006.01)
 F16H 48/20 (2012.01)
(52) U.S. Cl.
 CPC ............ F16D 41/088 (2013.01); B60K 17/26 (2013.01); B60K 23/06 (2013.01); F16D 41/067 (2013.01); F16H 48/16 (2013.01); F16D 2041/0605 (2013.01); F16H 2048/202 (2013.01)
(58) Field of Classification Search
 CPC ........... F16D 2041/0605; F16D 41/067; F16D 41/088; F16D 41/06; F16H 48/16; F16H 2048/202; F16H 48/34; B60K 17/02; B60K 17/34–17/3467; B60K 17/26; B60K 23/06; F16F 1/18–1/30
 USPC .............. 192/45.013, 41.015, 49, 50; 74/650
 See application file for complete search history.

(56) References Cited

U.S. PATENT DOCUMENTS

| | | | |
|---|---|---|---|
| 6,629,590 B2 | 10/2003 | Ochab et al. | |
| 9,885,393 B2 * | 2/2018 | Mori ..................... | F16D 41/067 |
| 11,592,094 B2 | 2/2023 | Hamrin et al. | |
| 11,781,608 B2 * | 10/2023 | Murphy ............... | F16D 41/067 |
| | | | 192/45.008 |
| 11,828,354 B2 | 11/2023 | Hamrin et al. | |

* cited by examiner

*Primary Examiner* — Richard M Lorence
(74) *Attorney, Agent, or Firm* — Fogg & Powers LLC

(57) ABSTRACT

A roller spring member for an overrunning clutch is provided. A first bridge connecting portion couples a bridge to a first spring central location of a first leaf spring. A second bridge connecting portion couples the bridge to a second spring central location of a second leaf. The roller spring member further includes at least one of, each of the first bridge connecting portion and the second bridge connecting portion including an undercut radius section, each of the first leaf spring and the second leaf spring being tapering from an associated one of the first spring central location of the first leaf spring and the second leaf spring central location of the second leaf spring to a first end and a second end, and each of the first leaf spring and the second leaf spring including a straight portion proximate the central locations.

19 Claims, 10 Drawing Sheets

ROLLER SPRING MEMBERS FOR AN OVERRUNNING CLUTCH

BACKGROUND

Vehicle differentials transfer torque between a driveshaft and driven shafts (or half shafts). A differential allows the half shafts to rotate at different rotational speeds relative to each other when a vehicle turns to prevent tire scrubbing, reduce transmission loads, and reduce under-steering during cornering (the tendency of the vehicle to go straight in a corner). In four-wheel drive applications overrunning clutches (ORC), that include bi-directional (ORC), have been employed in differentials to transmit torque to the wheel via the half shafts when needed. For example, in a front differential example, the front differential is designed to transfer torque when the rear wheels are rotating faster than the front wheels.

Overrunning clutch designs may incorporate a roller cage. A roller cage has different modes of operation. A rotational position of the roller cage relative to a clutch cam housing determines the operating mode of the drive. If the roller cage is retarded from its neutral position, the drive operates as an overrunning clutch (ORC) mode. If the cage is in its neutral position, the drive is fully disengaged. If the cage is advanced, the drive operates as an under-running clutch (URC) mode.

A roller cage holds a plurality of rollers that are used to selectively lock rotation of a clutch cam housing and side hubs therein allowing torque to be transferred between the clutch cam housing and the side hubs. The roller cage may use roller spring members to center rollers in selected windows of the roller cage.

For the reasons stated above and for other reasons stated below which will become apparent to those skilled in the art upon reading and understanding the present specification, there is a need in the art for effective and efficient roller spring members.

SUMMARY

The following summary is made by way of example and not by way of limitation. It is merely provided to aid the reader in understanding some of the aspects of the subject matter described. Embodiments provide roller spring members for an over-running clutch that may be used in a vehicle differential.

In one embodiment, a roller spring member for a roller cage of an overrunning clutch is provided. The roller spring includes a first leaf spring, a second leaf spring and a bridge. The second leaf spring is positioned in a parallel configuration with the first leaf spring. A first bridge connecting portion couples the bridge to a first spring central location of the first leaf spring. A second bridge connecting portion couples the bridge to a second spring central location of the second leaf. The roller spring member further includes at least one of, each of the first bridge connecting portion and the second bridge connecting portion including a first undercut radius section and a second undercut radius section, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring.

In another example, a differential with an overrunning clutch is provided. The differential includes a housing, a ring gear, a clutch cam housing, a first side hub, a second side hub and a roller cage assembly. The ring gear is positioned within the housing and is in operational communication with a pinion. The clutch cam housing includes a central passage. An inside surface defines the central passage of the clutch cam housing including spaced cam features. A rotation of the clutch cam housing is locked to a rotation of the ring gear within the housing. A first portion of a first side hub is received within the central passage of the clutch cam housing. A second portion of a second side hub is also received within the central passage of the clutch cam housing. The roller cage assembly is received within the central passage of the clutch cam housing. The roller cage assembly is further positioned between the inside surface of the central passage of the clutch cam housing and the first portion of the first side hub and the second portion of the second side hub. The roller cage assembly includes a roller cage, plurality of rollers, a plurality of roller spring members and a centering spring. The plurality of rollers are positioned within windows of the roller cage. The plurality of rollers include a first set of rollers engaging an outside surface of the first portion of the first side hub and a second set of rollers engaging an outside surface of the second portion of the second side hub. The plurality of roller spring members are positioned to engage the plurality of rollers within the windows of the roller cage. Each roller spring member includes a first leaf spring, a second leaf spring and a bridge. The second leaf spring is positioned in a parallel configuration with the first leaf spring. A first bridge connecting portion coupled the bridge to a first spring central location of the first leaf spring. A second bridge connecting portion couples the bridge to a second spring central location of the second leaf. Each roller spring member including at least one of, each of the first bridge connecting portion and the second bridge connecting portion including a first undercut radius section and a second undercut radius section that are symmetrically located to spread out a transition in stiffness, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring. The centering spring engages the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing.

In yet another example, a vehicle is provided. The vehicle includes a motor, a transmission, a rear differential, a pair of rear wheels, a pair of front wheels, a front differential. The motor provides engine torque. The transmission is in operational communication to receive the engine torque. The rear differential is in operational communication with the transmission. The pair of rear wheels are in operational communication with the rear differential. The front differential selectively couples torque between the transmission and at least one front wheel of the pair of front wheels. The front differential includes a ring gear and an overrunning clutch. The ring gear is positioned within a housing of the front differential. The ring gear is in operational communication with a pinion. The pinion is in operational communication with the transmission. The overrunning clutch includes a clutch cam housing and a roller cage, a plurality of rollers, a plurality of roller spring members, and a centering spring. The clutch cam housing includes a central passage. An inside surface of the clutch cam housing defines the central passage including spaced cam features. A rotation of the clutch cam housing is locked to a rotation of the ring gear within the housing. The plurality of rollers are positioned within windows of the roller cage. The plurality of rollers includes a first set of rollers engaging an outside surface of a first portion of a first side hub and a second set of rollers engaging an outside surface of a first portion of the second side hub. The plurality of roller spring members are positioned to engage the plurality of rollers within the windows of the roller cage. Each roller spring member includes a first leaf spring, a second leaf spring and a bridge. The second leaf spring is positioned in a parallel configuration with the first leaf spring. A first bridge connecting portion couples the bridge to a first spring central location of the first leaf spring. A second bridge connecting portion couples the bridge to a second spring central location of the second leaf. Each roller spring member including at least one of, each of the first bridge connecting portion and the second bridge connecting portion including a first undercut radius section and a second undercut radius section that are symmetrically located to spread out a transition in stiffness, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring. The centering spring engages the clutch cam housing and the roller cage to position each roller of the plurality of rollers in a central location within an associated cam feature of the spaced cam features in the inside surface of the clutch cam housing to place the bi-directional over-running clutch in a neutral position.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide roller spring members for use in a roller cage. The roller cage may be used in an over-running clutch of a differential. Roller spring members in examples are designed with reduced stress features that result in an improved over-running clutch system. In one example, a reduced stress feature includes symmetric undercut radius sections in bridge connecting portions. In another example, leaf springs of each roller spring member are tapered from a center width at a bridge connection to opposite ends of the leaf spring. Further in another embodiment, each roller spring member includes a straight portion in each leaf spring near the bridge connection.

Figure 1:
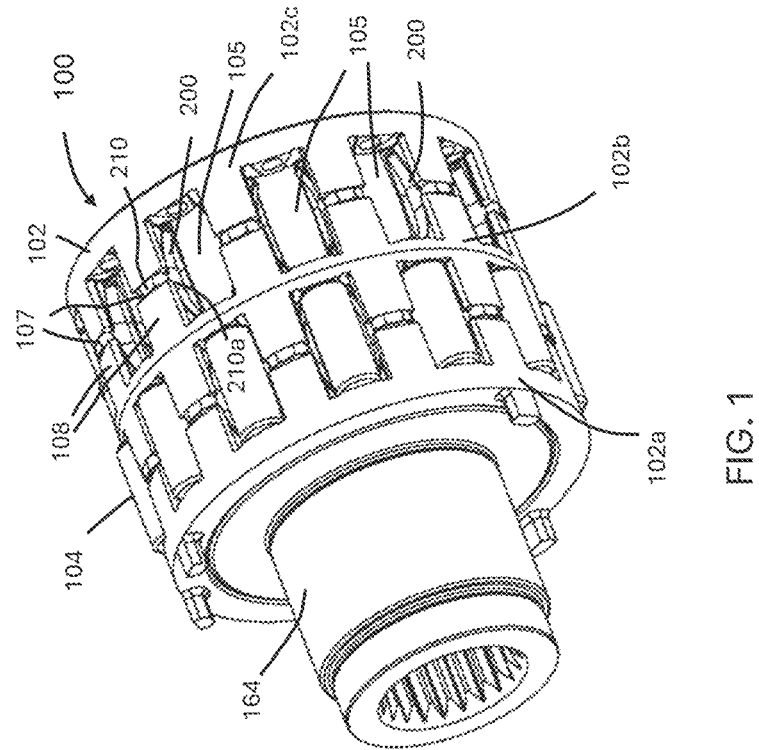
FIG. 1 illustrates a side perspective view of a roller cage assembly of an over-running clutch including roller spring members according to an example aspect of the present invention.
Figure 2:
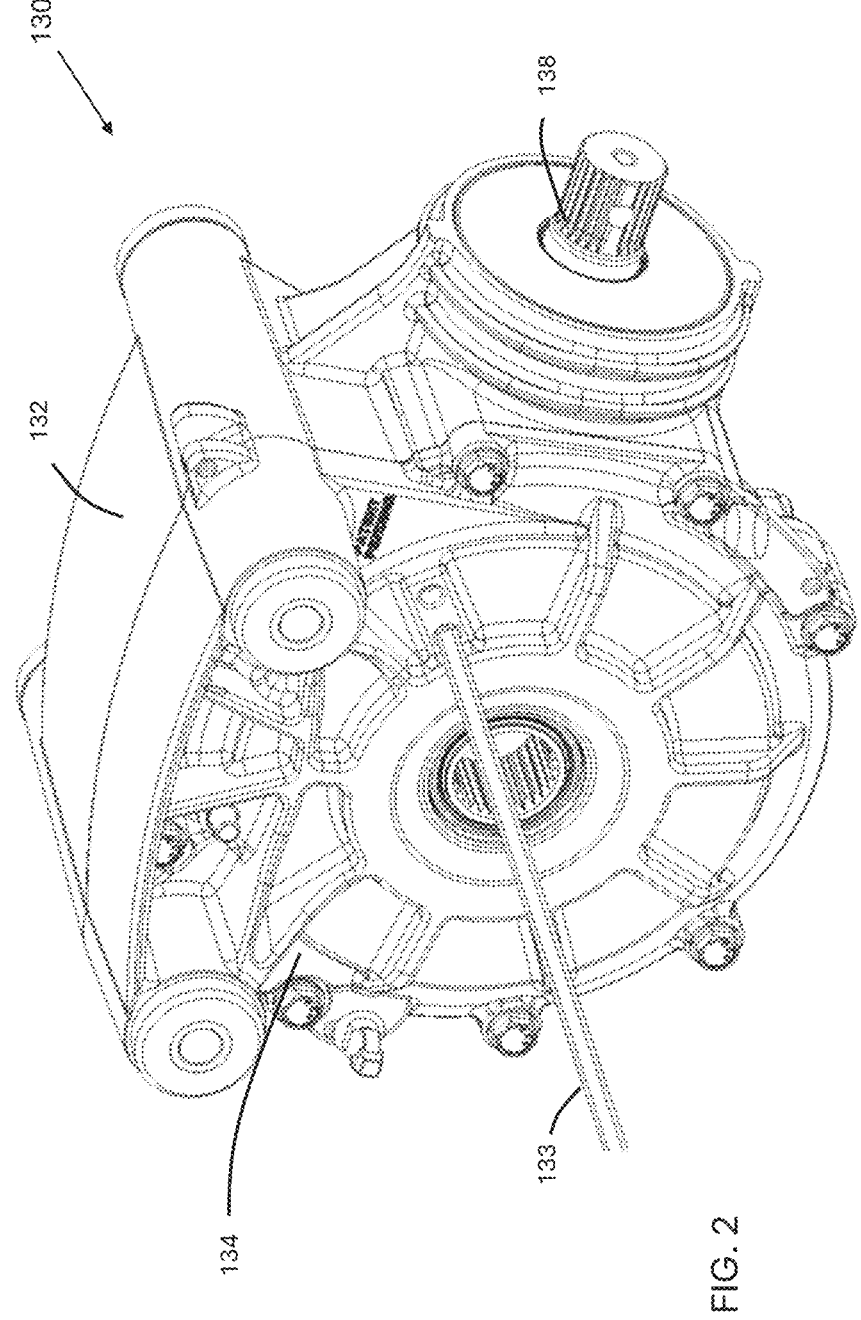
FIG. 2 illustrates a side perspective view of a differential that includes the roller cage assembly of FIG. 1 according to an example aspect of the present invention.
Figure 3:
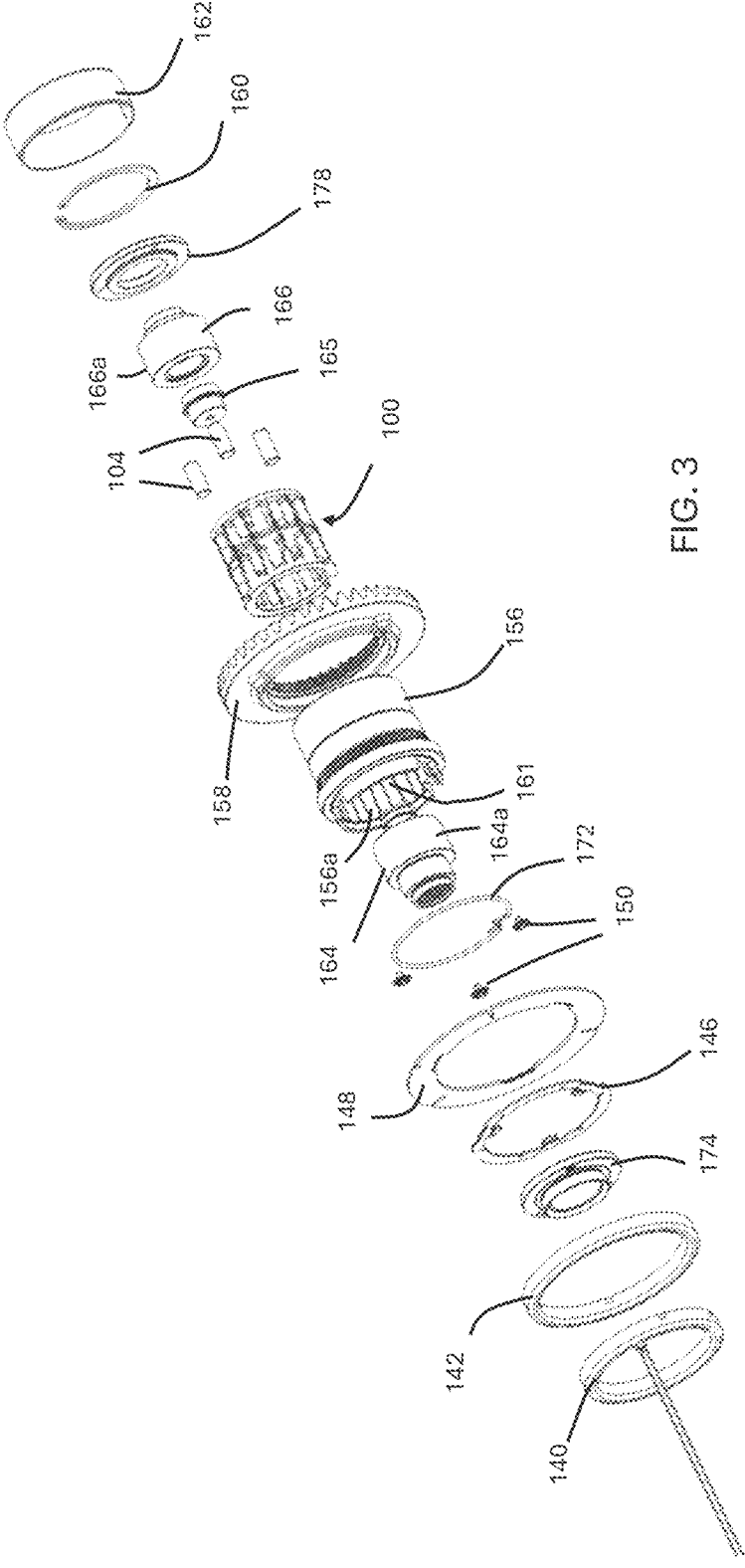
FIG. 3 illustrates a side perspective unassembled view of an internal portion of the differential of FIG. 2.

An example of an assembled roller cage assembly 100 of one embodiment is provided in FIG. 1. The roller cage assembly 100 includes a roller cage 102, rollers 104 and roller spring members 200. The roller cage assembly 100 may be part of a differential that includes an overrunning clutch (ORC). In one example, the overrunning clutch is bi-directional overrunning clutch. An example of a differential 130 is illustrated in FIG. 2. In this example, the differential 130 is a front differential. However, embodiments of the overrunning clutch with inertial compensation tuning may be applied to any type of differential system. As illustrated, in FIG. 2, the differential 130 includes a housing 132 (or case) and a cover 134. An activation input cable 133 is used to selectively activate an ORC electromagnet in this example. Further illustrated in FIG. 2 is a transmission input coupler (pinion 138) that in one embodiment includes a pinion gear (not shown). The pinion 138 is configured to couple torque between a transmission and the differential 130 via prop shaft, drive shaft, or the like. The pinion 138 is further in operational communication with the ring gear 158 illustrated in FIG. 3.

The roller cage assembly 100 includes a clutch cam housing 156 (best illustrated in FIGS. 5A through 5D). The roller cage 102 is received within a central passage 161 of the clutch cam housing 156. The centering spring 172, which engages the roller cage 102 and clutch cam housing 156 positions the rollers 104 in the windows 105 of the roller cage 102 such that each roller 104 is aligned within an associated cam feature 156a within the interior surface of the clutch cam housing 156 as further discussed below in detail when overrunning clutch is in a neutral position. Received within the roller cage 102 are a first side hub 164, a second side hub 166 and a centering hub 165. The first side hub 164 and the second side hub 166 are best illustrated in the unassembled side perspective view of FIG. 3. The first side hub 164 and second side hub 166 are designed to couple torque between the hubs 164 and 166 and their associated half shafts (such as half shafts 318a and 318b of FIG. 6). The rollers 104 of the roller cage 102 engage an outer surface of a first portion 164a of the first side hub 164 and an outer surface of a second portion 166a of the second side hub 166. In particular, a first set of rollers 104 engage a first portion 164a of the first side hub 164 and a second set of rollers 104 engage a second portion 166a of the second side hub 166.

The rollers 104 in part, located by the roller cage 102, are operationally engaged with outer surfaces of a first portion of the side hubs 164 and 166. In an example, a roller cage portion of the roller cage 102 never directly touches the clutch cam housing 156 but is located in all degrees of freedom except rotation by the end caps 174 and 178 that are located by the clutch cam housing 156. The end caps 174 and 178 are located by the clutch cam housing 156 with second portions of associated side hubs 164 and 166 in this example. Further illustrated in FIG. 3, the bi-directional overrunning clutch includes a retaining clip 160 and a plain bearing 162. The end caps 174 and 178 are located by the clutch cam housing 156. The first side hub 164 and the second side hub 166 are located in part by the end caps 174 and 178.

When the system is engaged in an ORC or URC mode, the rollers 104 are in direct contact with the clutch cam features of 156a of the clutch cam housing 156 and an outside first surface of a first portion 164a of a first side hub 164 and an outside second surface of a second portion 166a of the second side hub 166 to transfer torque between the clutch cam housing 156 and at least one of the first and second side hubs 164 and 166.

The overrunning clutch may include an inertial compensation tuning system with a centering spring 172. The centering spring 172 engages the clutch cam housing 156 and the roller cage 102 to position the rollers 104 of the roller cage 102 in relation to the cam features 156a of the clutch cam housing 156 so torque is not transferred between the clutch cam housing 156 and the side hubs 164 and 166 during de-energized neutral operating conditions. This may be described as the neutral position of the roller cage assembly 100 (of neutral position of the overrunning clutch). FIGS. 5A through 5D illustrate the positioning of the roller cage 102 and rollers 104 relative to the clutch cam housing 156 and side hubs 164 and 166 in different operating modes as discussed below.

The differential 130 in this example, includes an inertial compensation assembly that balances rotational inertial torques of the roller cage assembly 100 to a clutch cam housing 156 to prevent unintended activation of the overrunning clutch. The inertial compensation assembly includes an ORC armature friction plate (armature plate 146) and an ORC electromagnetic coil (ORC coil 140). The armature plate 146 is selectively positioned relative to the clutch cam housing 156 by the ORC coil 140 to control the roller cage assembly 100 position in relation to a clutch cam housing 156.

The inertial compensation assembly may further include a flyweight friction plate (flyweight plate 148), pivot gears 150 and a (BDM) coil (back-drive mode coil 142). The flyweight plate 148 is selectively positioned by the back-drive coil 142 in conjunction with the centering spring 172 to control rotation of the roller cage assembly 100 in relation to the clutch cam housing 156 to control the roller cage assembly 100 position in relation to the neutral position.

The roller cage assembly 100, as best illustrated in FIG. 1, includes the roller cage 102 that, in this example, is formed from three portions, a first end portion 102a, a second end portion 102c and mid-portion 102b that is positioned between the first end portion 102a and the second end portion 102c. The roller cage assembly 100 further includes two rows (sets) rollers 104 that are positioned within roller cage windows 105. The second row of rollers, that engage a portion of the second side hub 166 are not shown within the associated windows 105 in FIG. 1 in order to clearly show the roller spring members 200.

Figure 4A:
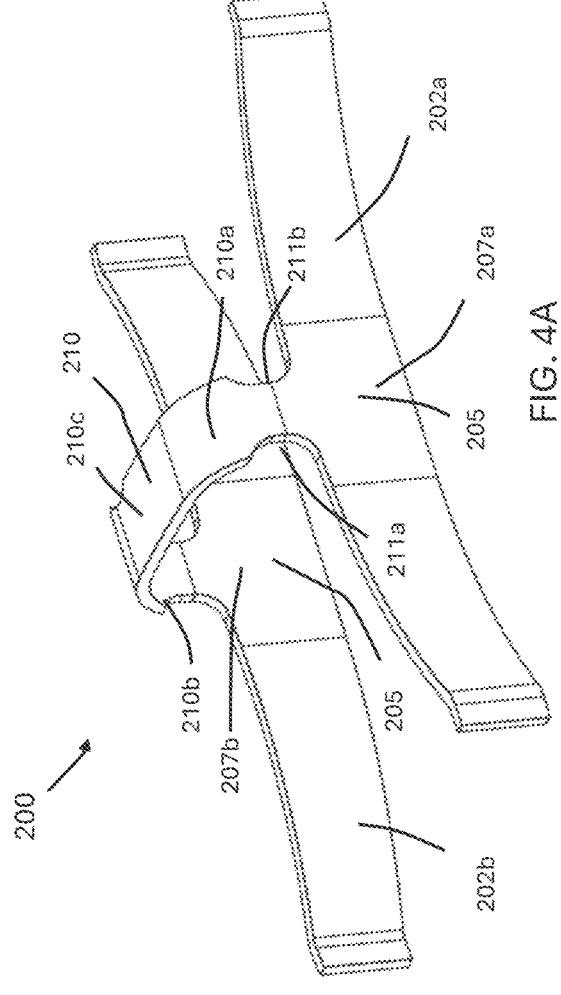
FIG. 4A illustrates a side perspective view of a roller spring member according to an example aspect of the present invention.
Figure 4B:
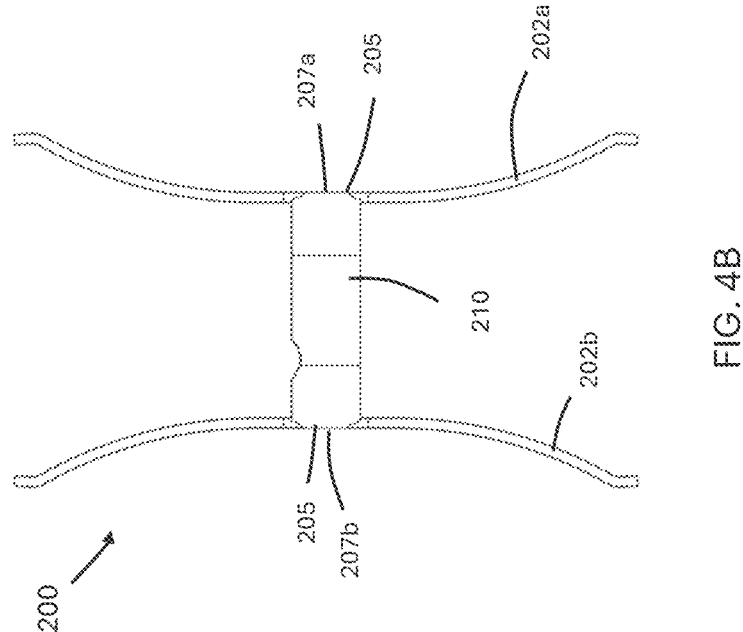
FIG. 4B illustrates a top view of the roller spring member of FIG. 4A.
Figure 4C:
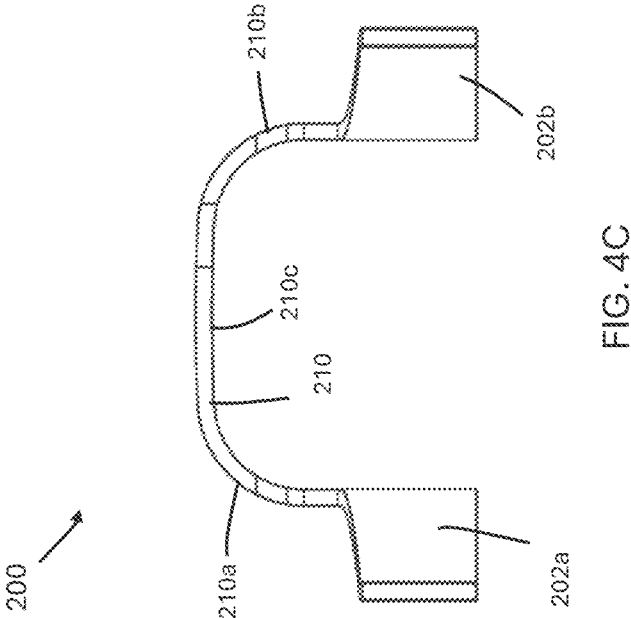
FIG. 4C illustrates an end view of the roller spring member of FIG. 4A.
Figure 4D:
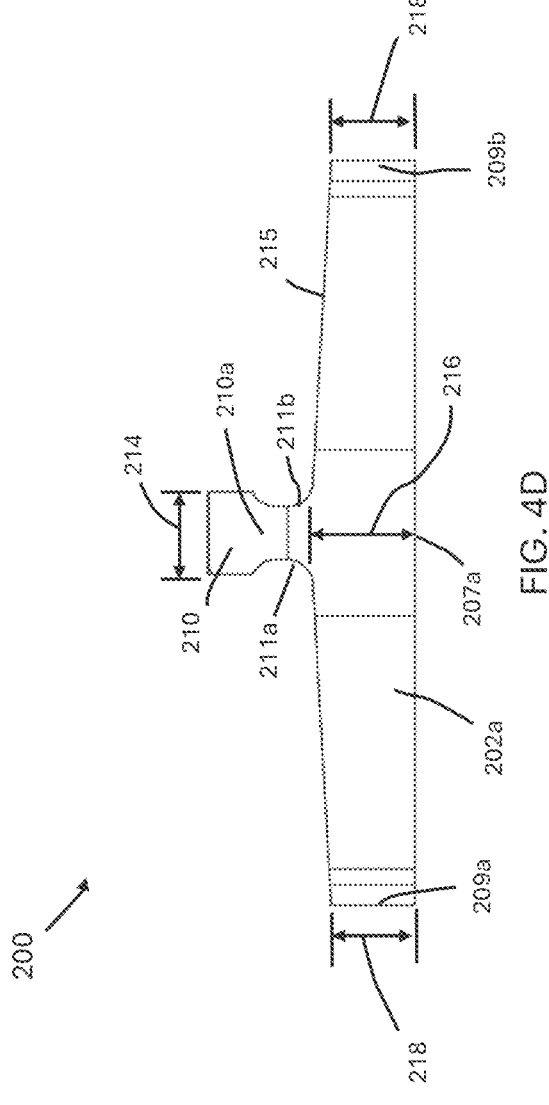
FIG. 4D illustrates a side view of the roller spring member of FIG. 4A.

An example of a roller spring member 200 is illustrated in FIGS. 4A through 4D. FIG. 4A illustrates a side perspective view of one example of a roller spring member 200. FIG. 4B illustrates a top view of the roller spring member 200. FIG. 4C illustrates an end view of the roller spring member 200 while FIG. 4D illustrates a side view of the roller spring member 200. The roller spring member 200 is herein described in view of FIGS. 4A through 4D. As best illustrated in the top view of FIG. 4B, the roller spring member 200 is generally in a H-Shape and can be generally referred to as a H-spring.

Roller spring member 200 includes a pair of leaf springs, a first leaf spring 202a and as second leaf spring 202b that are connected by a bridge 210. As best illustrated in the top view of FIG. 4B, bridge 210 is centrally positioned in relation to each of the first leaf spring 202a and the second leaf spring 202b.

The bridge 210 includes a mid-bridge portion 210c that is positioned between a first bridge connecting portion 210a that is coupled to the first leaf spring 202a and a second bridge connecting portion 210b that is coupled to the second leaf spring 202b. The arrangement generally positions the first leaf spring 202a in a parallel fashion with the second leaf spring 202b. The first bridge connecting portion 210a and the second bridge connecting portion 210b are curved to position the mid-bridge portion 210c above the respective first leaf spring 202a and the second leaf spring 202b.

Referring to FIG. 1, the bridge 210 of each roller spring member 200 is received within an associated groove 107 in an associated support pillar portions 108 of the roller cage 102 to position the first leaf spring 202a and second leaf spring 202b in respective windows 105 of the roller cage 102. In an example, the grooves 107 are formed at the connections between the mid-portion 102b and the first end portion 102a and the second end portion 102c of the roller cage 102. The spaced support pillars portions 108 form the windows 105 in which the first leaf springs 202a and second leaf springs 202b of each roller spring member 200 are received. The rollers 104 are received within the windows 105. A first leaf spring 202a and a second leaf spring 202b of adjacently positioned roller spring members 200 engage a roller 104 in an associated window 105.

The bridge 210, which may be referred to as the center bridge that connects the first leaf spring 202a and the second leaf spring 202b allows the roller spring member 200 to be snapped into place on the roller cage 102. Bridge 210 gives the roller spring member 200 the general H-shape. As an associated first leaf spring 202a and second leaf spring 202b is flexed, the stiffness discontinuity at the bridge 210 leads to a rise in stress at the transition to the bridge 210 (at the first bridge connecting portion 210a and the second bridge connecting portion 210b). In order to achieve adequate spring fatigue life, this rise in stress can be addressed with either higher performance materials, or geometry shapes that reduce stress. Higher performance materials generally are associated with higher costs. A reduced stress geometry is provided in examples.

One example of a reduced stress feature that may be used, is symmetric undercut radius sections in the first bridge connecting portion 210a and the second bridge connecting portion 210b of each roller spring member 200. Examples of symmetric undercut radius sections include the first undercut radius section 211a and the second undercut radius section 211b illustrated best in FIG. 4A and FIG. 4D. As illustrated, the first undercut radius section 211a and the second undercut radius section 211b are curved portions that reduces a bridge width 214 of the first bridge connection portion 210a and the second bridge connection portion 210b in a symmetric fashion at the connection of the bridge 210 to the respective first leaf spring 202a and second leaf spring 202b. Use of the undercut radius sections in the first bridge connection portion 210a and the second bridge connection portion 210b reduces spring stress by spreading out a transition in stiffness when the first leaf spring 202a and the second leaf spring 202b are flexed as well as reducing the overall stiffness of the bridge 210.

A second feature to reduce stress in the roller spring member 200 is that the first leaf spring 202a and the second leaf spring 202b are tapered from a center height 216 at a respective first spring central location 207a and second spring central location 207b of an associated first leaf spring 202a and second leaf spring 202b to narrower end height 218 at a respective first end 209a and an opposably positioned second end 209b of the respective first leaf spring 202a and the second leaf spring 202b. Hence the center height 216 is greater than the end height 218. The first spring central location 207a is centrally located in the first bridge connection portion 210a and the second spring central location 207b is centrally located in the second bridge connection portion 210b. An example of this feature is best illustrated in the side view of the roller spring member 200 showing the first leaf spring 202a of FIG. 4D. This feature allows the stiffness of each leaf spring to be gradually reduced towards the ends. For a given overall roller/spring travel, this means that more of the spring flex is away from the bridge 210, therein reducing stress at the bridge stiffness discontinuity and spreading out the stress for better material utilization. In one example, a top edge 215 of each of the first leaf spring 202a and the second leaf spring 202b is tapered down to the respective first end 209a and second end 209b.

A third feature is a substantially straight portion 205 in each first leaf spring 202a and the second leaf spring 202b located proximate a respective first spring central location 207a and a second spring central location 207b. The first spring central location 207a and the second spring central location 207b are located where the associated first bridge connecting portion 210a and the second bridge connecting portion 210b are coupled to the respective first leaf spring 202a and second leaf spring 202b. This is best illustrated in FIGS. 4A and 4B. This feature results in less deflection near the bridge 210 therein reducing deflected spring stress near the bridge 210.

An example operation of the overrunning clutch that includes the roller cage assembly 100, a side hub (the first side hub 164 in this view), and the clutch cam housing 156 are illustrated in the partial subassemblies of an overrunning clutch 250 of FIG. 5A through FIG. 5D. The rollers 104 received in the windows 105 of the roller cage 102 engage an outer surface of a first portion 164a of the first side hub 164.

Figures 5A, 5B:
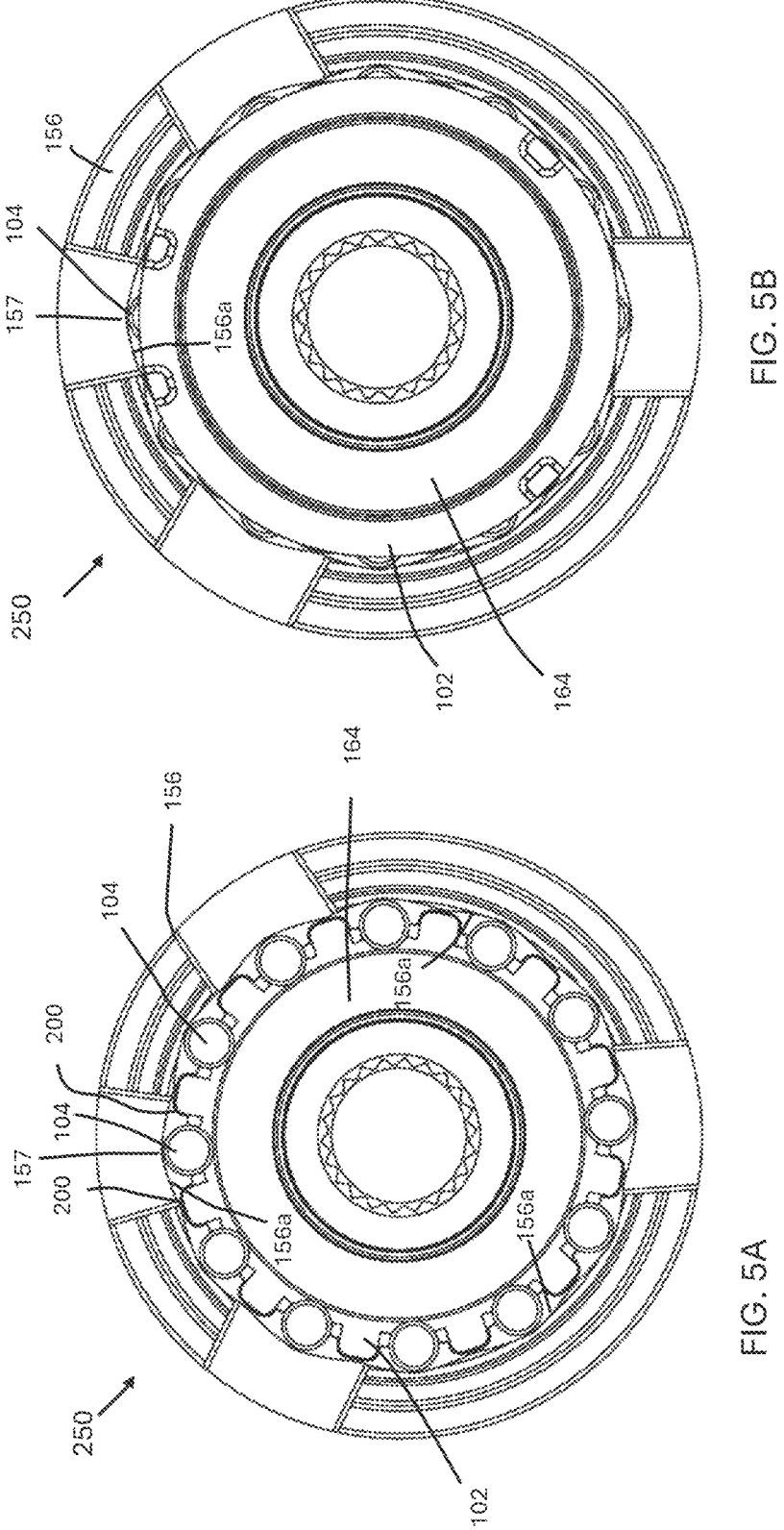
FIG. 5A illustrates an end view of partial subassemblies of an overrunning clutch in a neutral position that includes roller spring members according to an example aspect of the present invention.
FIG. 5B also illustrates an end view of partial subassemblies of an overrunning clutch in a neutral position according to an example aspect of the present invention.
Figure 6:
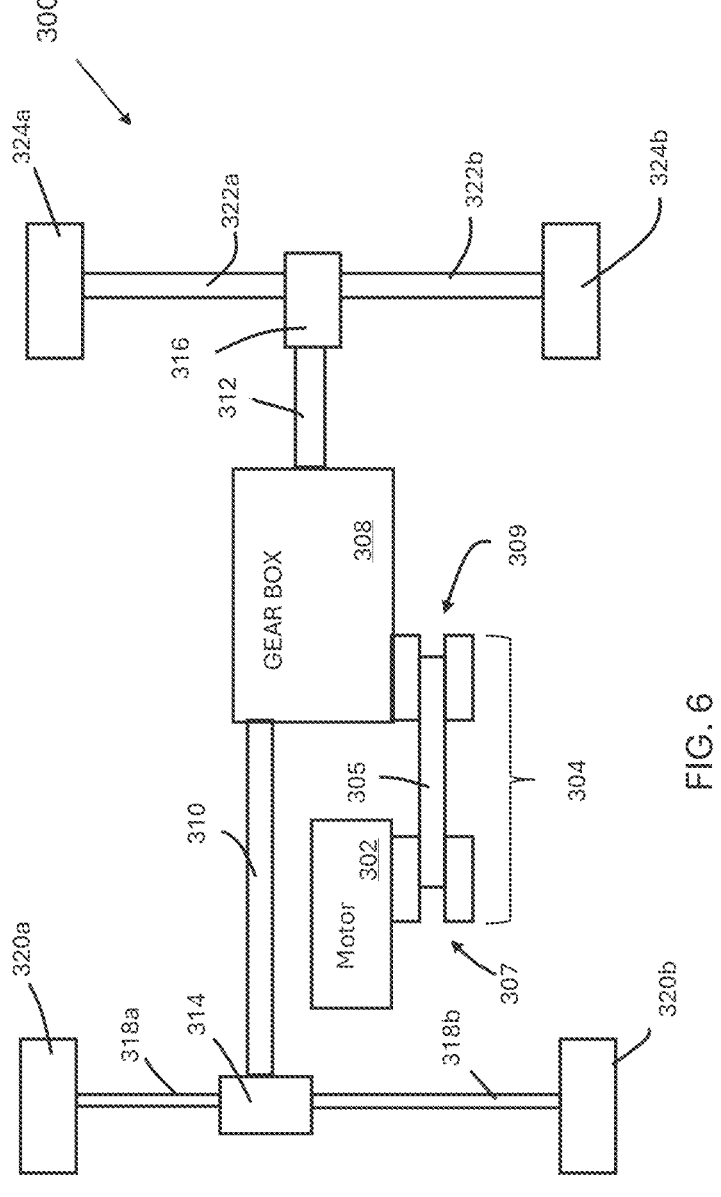
FIG. 6 illustrates a block diagram of vehicle that includes roller spring member in a differential according to an example aspect of the present invention.

In the partial subassembly view of the overrunning clutch 250 of FIG. 5A, each roller is aligned with a center 157 of a respective clutch cam feature 156a in an inside surface of the clutch cam housing 156. In this position, torque is not being transferred between the clutch cam housing 156 and the first side hub 164 because the rollers 104 do not engage the inside surface of the clutch cam housing 156 at the center point of each clutch cam feature 156a. In FIG. 5A a portion of the roller cage (the first end portion 102a) is removed to view rollers 104. FIG. 5B illustrates the overrunning clutch 250 that includes the first end portion 102a of the roller cage 102. The overrunning clutch 250 is in a disengaged neutral position in both FIG. 5A and FIG. 5B.

Figures 5C, 5D:
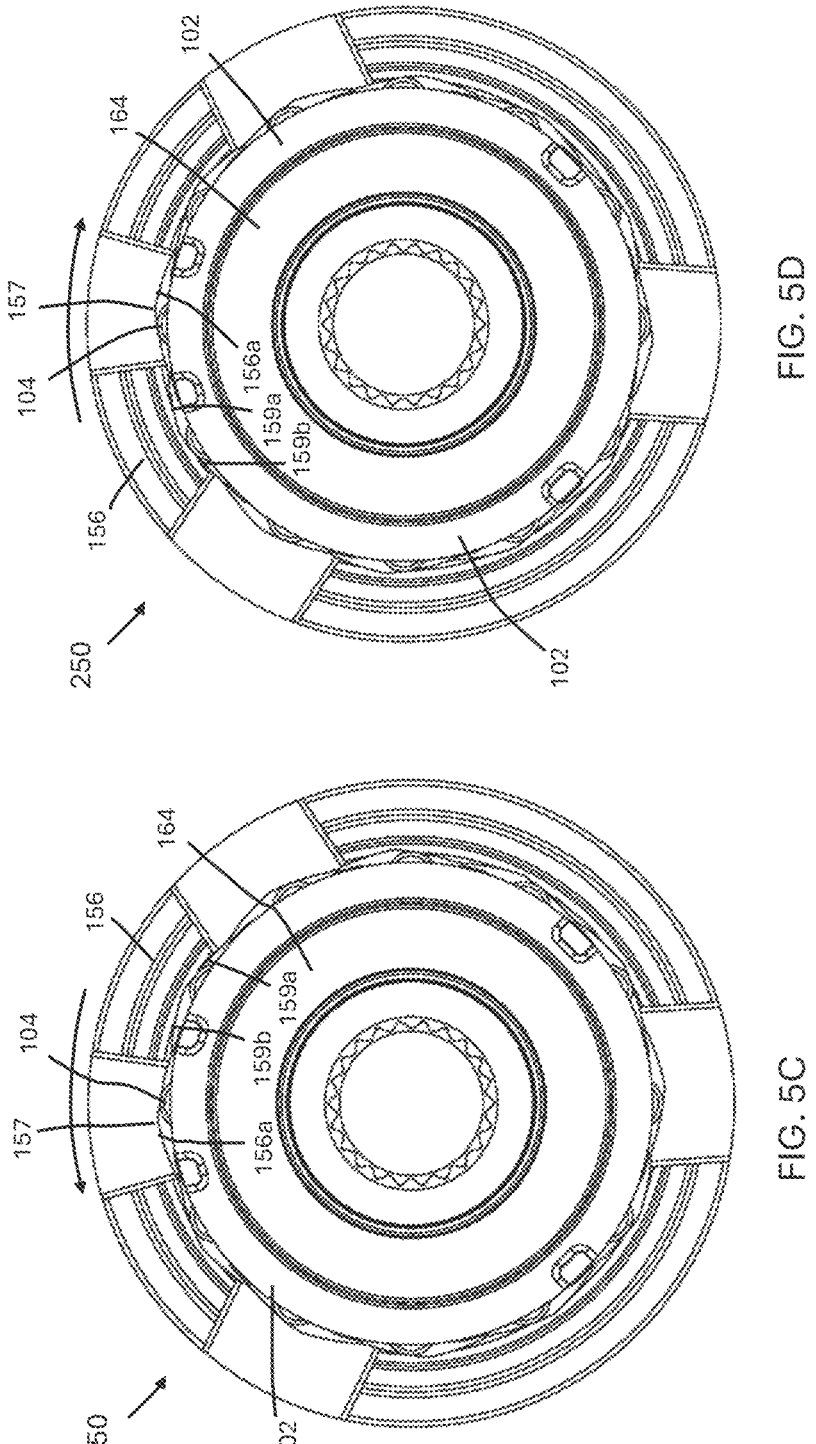
FIG. 5C illustrates an end view of partial subassemblies of an overrunning clutch in a forward drive position that includes roller spring members according to an example aspect of the present invention.
FIG. 5D illustrates an end view of partial subassemblies of an overrunning clutch in a reverse drive position that includes roller spring members according to an example aspect of the present invention.

FIG. 5C illustrates the partial subassembly of the overrunning clutch 250 in an engaged forward drive position (in an overrunning clutch (ORC) mode). In the forward drive position, the clutch cam housing 156 has rotated counterclockwise in relation to the roller cage 102 so the rollers 104 engage a first side 159a of their associated clutch cam feature 156a of the clutch cam housing 156 to transfer torque between the clutch cam housing 156 and the first output hub 164 in a forward direction.

FIG. 5D illustrates the partial subassembly of the overrunning clutch 250 in an engaged reverse drive position (in a reverse rotation overrunning clutch (ORC) mode). In the reverse drive position, the clutch cam housing 156 has rotated clockwise in relation to the roller cage 102 so the rollers 104 engage a second side 159b of their associated clutch cam feature 156a of the clutch cam housing 156 to transfer torque between the clutch cam housing 156 and the first output hub 164 in a reverse direction.

Index errors in clutch cam surfaces of the clutch cam features 156a (position deviations from a nominal theoretically perfect position) as well as the roller cage errors may cause some rollers 104 to engage before other rollers 104 have reached an engaged position. To be engaged, the roller 104 must be in contact with both an associated clutch cam feature 156a as well as anu outer surface of the associated output hub. A roller 104 will be in contact with an associated clutch cam feature 156a when the roller moves away from the center 157 of the clutch cam feature 156a. Through various methods, torque is selectively applied to the roller cage 102 to overcome the cage centering torsion spring 172. As a first roller 104 or set of rollers reach an engaged position, the roller spring members 200 that are in contact with those rollers 104 will deflect from the applied torque, allowing the roller cage 102 to continue with additional rotational travel. This additional roller cage travel ensures that the remaining rollers are also brought into an engaged position.

If the roller cage 102 did not employ roller spring members 200 but instead was rigid, some rollers 104 would not be in the proper position to engage while others would engage, reducing the load sharing and torque capacity of the overrunning clutch 250.

An example of vehicle 300 implementing a differential 130 that includes the roller spring members 200 in the roller cage assembly with an overrunning clutch as described above is provided in the block diagram of FIG. 6. The vehicle 300 in this example includes a transmission that in this example includes a continuously variable transmission (CVT) 304 and a gear box 308. The CVT includes a drive sheave assembly 307, a driven sheave assembly 309 and an endless looped member 305 such as a belt. The drive sheave assembly 307 is in operational communication with a motor 302 to receive engine torque. The driven sheave assembly 309 is in operational communication with the drive sheave assembly 307 via the endless looped member 305 to selectively communicate torque between the drive sheave assembly 307 and the driven sheave assembly 309.

The driven sheave assembly 309 is in operation communication with a drivetrain that, in this example, includes the gear box 308, front and rear driveshafts 310 and 312 (or prop shafts), front and rear differentials 314 and 316, front half shafts 318a and 318b, rear half shafts 322a and 322b, front wheels 320a and 320b and rear wheels 324a and 324b. The front differential 314 includes the roller cage assembly with an overrunning clutch as described above to selectively couple torque between the gear box 308 and the front wheels 320a and 320b when needed.

EXAMPLE EMBODIMENTS

Example 1 includes a roller spring member for a roller cage of an overrunning clutch. The roller spring includes a first leaf spring, a second leaf spring and a bridge. The second leaf spring is positioned in a parallel configuration with the first leaf spring. A first bridge connecting portion couples the bridge to a first spring central location of the first leaf spring. A second bridge connecting portion couples the bridge to a second spring central location of the second leaf. The roller spring member further includes at least one of, each of the first bridge connecting portion and the second bridge connecting portion including a first undercut radius section and a second undercut radius section, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring.

Example 2 includes the roller spring member of Example 1, wherein the first undercut radius section and the second undercut radius section are symmetrically located to spread out a transition in stiffness in the first bridge connecting portion and the second bridge.

Example 3 includes the roller spring member of any of the Examples 1-2, wherein a connecting portion width of each of the first bridge connecting portion and the second bridge connecting portion at the first undercut radius section and the second undercut radius section is less than a width of the bridge.

Example 4 includes the roller spring member of any of the Examples 1-3, wherein the second end of each of the first leaf spring and the second leaf spring is opposably positioned from the first end of each of the first leaf spring and the second leaf spring.

Example 5 includes the roller spring member of any of the Examples 1-4, wherein each of the first leaf spring and the second leaf spring are tapered from the associated first spring central location of the first leaf spring and the second leaf spring central location of the second leaf spring to the first end and the second end so a central height at the respective first spring central location and the second spring central location is greater than an end height at the first end and the second end.

Example 6 includes the roller spring member of any of the Examples 1-5, wherein the first spring central location of the first leaf spring is centrally located at the first bridge connecting portion and the second leaf spring central location is at the centrally located at the second bridge connecting portion.

Example 7 includes a differential with an overrunning clutch. The differential includes a housing, a ring gear, a clutch cam housing, a first side hub, a second side hub and a roller cage assembly. The ring gear is positioned within the housing and is in operational communication with a pinion. The clutch cam housing includes a central passage. An inside surface defines the central passage of the clutch cam housing including spaced cam features. A rotation of the clutch cam housing is locked to a rotation of the ring gear within the housing. A first portion of a first side hub is received within the central passage of the clutch cam housing. A second portion of a second side hub is also received within the central passage of the clutch cam housing. The roller cage assembly is received within the central passage of the clutch cam housing. The roller cage assembly is further positioned between the inside surface of the central passage of the clutch cam housing and the first portion of the first side hub and the second portion of the second side hub. The roller cage assembly includes a roller cage, plurality of rollers, a plurality of roller spring members and a centering spring. The plurality of rollers are positioned within windows of the roller cage. The plurality of rollers include a first set of rollers engaging an outside surface of the first portion of the first side hub and a second set of rollers engaging an outside surface of the second portion of the second side hub. The plurality of roller spring members are positioned to engage the plurality of rollers within the windows of the roller cage. Each roller spring member includes a first leaf spring, a second leaf spring and a bridge. The second leaf spring is positioned in a parallel configuration with the first leaf spring. A first bridge connecting portion coupled the bridge to a first spring central location of the first leaf spring. A second bridge connecting portion couples the bridge to a second spring central location of the second leaf. Each roller spring member including at least one of, each of the first bridge connecting portion and the second bridge connecting portion including a first undercut radius section and a second undercut radius section that are symmetrically located to spread out a transition in stiffness, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring. The centering spring engages the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing.

Example 8 includes the differential of Example 7, wherein the roller cage includes support pillar portions that form at least in part the windows of the roller cage, at least some of the support pillar portions including a groove, the bridge of each roller spring member received in the groove of an associated support pillar to position an associated first leaf spring and associated second leaf spring of the roller spring member in associated windows of the roller cage to engage associated rollers.

Example 9 includes the differential of any of the Examples 7-8, wherein the tapering of the first leaf spring and the second leaf spring provides a central height at the respective first spring central location and the second spring central location is greater than an end height of a first end and a second end of each of the first leaf spring and the second leaf spring.

Example 10 includes the differential of any of the Examples 7-9, wherein a connecting portion width of each of the first bridge connecting portion and the second bridge connecting portion at the first undercut radius section and the second undercut radius section is less than a width of the bridge.

Example 11 includes the differential of any of the Examples 7-10, wherein the first spring central location of the first leaf spring is centrally located at the first bridge connecting portion and the second leaf spring central location is at the centrally located at the second bridge connecting portion.

Example 12 includes the differential of any of the Examples 7-11, wherein the first spring central location of the first leaf spring is centrally located at the first bridge connecting portion and the second leaf spring central location is at the centrally located at the second bridge connecting portion.

Example 13 includes the differential of any of the Examples 7-12, further including a flyweight plate and a back-drive coil to selectively position the flyweight plate to control rotation of the roller cage assembly in relation to the clutch cam housing to prevent the roller cage assembly from advancing from the neutral position.

Example 14 includes the differential of any of the Examples 7-13, further including an armature plate and an overrunning clutch electromagnetic coil configured to selectively control the position of the armature plate to prevent the roller cage assembly from moving in relation to the clutch cam housing to prevent the roller cage assembly from retarding from the neutral position.

Example 15 includes a vehicle. The vehicle included a motor, a transmission, a rear differential, a pair of rear wheels, a pair of front wheels, a front differential. The motor provides engine torque. The transmission is in operational communication to receive the engine torque. The rear differential is in operational communication with the transmission. The pair of rear wheels are in operational communication with the rear differential. The front differential selectively couples torque between the transmission and at least one front wheel of the pair of front wheels. The front differential includes a ring gear and an overrunning clutch. The ring gear is positioned within a housing of the front differential. The ring gear is in operational communication with a pinion. The pinion is in operational communication with the transmission. The overrunning clutch includes a clutch cam housing and a roller cage, a plurality of rollers, a plurality of roller spring members, and a centering spring. The clutch cam housing includes a central passage. An inside surface of the clutch cam housing defines the central passage including spaced cam features. A rotation of the clutch cam housing is locked to a rotation of the ring gear within the housing. The plurality of rollers are positioned within windows of the roller cage. The plurality of rollers includes a first set of rollers engaging an outside surface of a first portion of a first side hub and a second set of rollers engaging an outside surface of a first portion of the second side hub. The plurality of roller spring members are positioned to engage the plurality of rollers within the windows of the roller cage. Each roller spring member includes a first leaf spring, a second leaf spring and a bridge. The second leaf spring is positioned in a parallel configuration with the first leaf spring. A first bridge connecting portion couples the bridge to a first spring central location of the first leaf spring. A second bridge connecting portion couples the bridge to a second spring central location of the second leaf. Each roller spring member including at least one of, each of the first bridge connecting portion and the second bridge connecting portion including a first undercut radius section and a second undercut radius section that are symmetrically located to spread out a transition in stiffness, each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring. The centering spring engages the clutch cam housing and the roller cage to position each roller of the plurality of rollers in a central location within an associated cam feature of the spaced cam features in the inside surface of the clutch cam housing to place the bi-directional overrunning clutch in a neutral position.

Example 16 includes the vehicle of Example 15, wherein the roller cage includes support pillar portions that form at least in part the windows of the roller cage. At least some of the support pillar portions include a groove. The bridge of each roller spring member received in the groove of an associated support pillar to position an associated first leaf spring and associated second leaf spring of the roller spring member in associated windows of the roller cage to engage associated rollers.

Example 17 includes the vehicle of any of the Examples 15-16, wherein the tapering of the first leaf spring and the second leaf spring provides a center height at the respective first spring central location and the second spring central location that is greater than an end height of the first end of and the second end of each of the first leaf spring and the second leaf spring.

Example 18 includes the vehicle of any of the Examples 15-17, wherein a connecting portion width of each of the first bridge connecting portion and the second bridge connecting portion at the first undercut radius section and the second undercut radius section is less than a width of the bridge.

Example 19 includes the vehicle of any of the Examples 15-18, further including a flyweight plate and a back-drive coil to selectively position the flyweight plate to control rotation of the roller cage in relation to the clutch cam housing to prevent the overrunning clutch from advancing from the neutral position.

Example 20 includes the vehicle of any of the Examples 15-19, further including an armature plate and an overrunning clutch electromagnetic coil configured to selectively control a position of the armature plate to prevent the roller cage from moving in relation to the clutch cam housing to prevent the overrunning clutch from retarding from the neutral position.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A roller spring member for an overrunning clutch, the roller spring member comprising:
    a first leaf spring;
    a second leaf spring positioned in a parallel configuration with the first leaf spring;
    a bridge;
    a first bridge connecting portion coupling the bridge to a first spring central location of the first leaf spring;
    a second bridge connecting portion coupling the bridge to a second spring central location of the second leaf spring; and
    wherein the roller spring member further includes at least one of,
        each of the first bridge connecting portion and the second bridge connecting portion including a first undercut radius section and a second undercut radius section,
        each of the first leaf spring and the second leaf spring being tapering from an associated one of the first spring central location of the first leaf spring and the second leaf spring central location of the second leaf spring to a first end and a second end of each one of the first leaf spring and the second leaf spring, and
        each of the first leaf spring and the second leaf spring including a straight portion, the straight portion being proximate the associated one of the first spring central location and the second spring central location of the first leaf spring and the second leaf spring.

2. The roller spring member of claim 1, wherein the first undercut radius section and the second undercut radius section are symmetrically located to spread out a transition in stiffness in the first bridge connecting portion and the second bridge.

3. The roller spring member of claim 1, wherein a connecting portion width of each of the first bridge connecting portion and the second bridge connecting portion at the first undercut radius section and the second undercut radius section is less than a width of the bridge.

4. The roller spring member of claim 1, wherein the second end of each of the first leaf spring and the second leaf spring is opposably positioned from the first end of each of the first leaf spring and the second leaf spring.

5. The roller spring member of claim 1, wherein each of the first leaf spring and the second leaf spring are tapered from the associated first spring central location of the first leaf spring and the second leaf spring central location of the second leaf spring to the first end and the second end so a central height at the respective first spring central location and the second spring central location is greater than an end height at the first end and the second end.

6. The roller spring member of claim 1, wherein the first spring central location of the first leaf spring is centrally located at the first bridge connecting portion and the second leaf spring central location is at the centrally located at the second bridge connecting portion.

7. A differential with an overrunning clutch, the differential including:
    a housing;
    a ring gear positioned within the housing being in operational communication with a pinion;
    a clutch cam housing including a central passage, an inside surface defining the central passage of the clutch cam housing including spaced cam features, a rotation of the clutch cam housing being locked to a rotation of the ring gear within the housing;
    a first portion of a first side hub received within the central passage of the clutch cam housing;
    a second portion of a second side hub received within the central passage of the clutch cam housing; and
    a roller cage assembly received within the central passage of the clutch cam housing, the roller cage assembly further positioned between the inside surface of the central passage of the clutch cam housing and the first and second portions of the first and second side hubs, the roller cage assembly including,
        a roller cage,
        a plurality of rollers positioned within windows of the roller cage, the plurality of rollers including a first set of rollers engaging an outside surface of the first portion of the first side hub and a second set of rollers engaging an outside surface of the second portion of the second side hub, and
        a plurality of roller spring members positioned to engage the plurality of rollers within the windows of the roller cage, each roller spring member including,
            a first leaf spring,
            a second leaf spring positioned in a parallel configuration with the first leaf spring,
            a bridge,
            a first bridge connecting portion coupling the bridge to a first spring central location of the first leaf spring, and
            a second bridge connecting portion coupling the bridge to a second spring central location of the second leaf spring, each roller spring member including at least one of,
                each of the first bridge connecting portion and the second bridge connecting portion including a first undercut radius section and a second undercut radius section that are symmetrically located to spread out a transition in stiffness,
                each of the first leaf spring and the second leaf spring being tapering from an associated one of the first spring central location of the first leaf spring and the second leaf spring central location of the second leaf spring to a first end and a second end of each one of the first leaf spring and the second leaf spring, and each of the first leaf spring and the second leaf spring including a straight portion, the straight portion being proximate the associated one of the first spring central location and the second spring central location of the first leaf spring and the second leaf spring; and a centering spring engaging the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing.

8. The differential of claim 7, wherein the roller cage includes support pillar portions that form at least in part the windows of the roller cage, at least some of the support pillar portions including a groove, the bridge of each roller spring member received in the groove of an associated support pillar to position an associated first leaf spring and associated second leaf spring of the roller spring member in associated windows of the roller cage to engage associated rollers.

9. The differential of claim 7, wherein the tapering of the first leaf spring and the second leaf spring provides a central height at the respective first spring central location and the second spring central location is greater than an end height of a first end and a second end of each of the first leaf spring and the second leaf spring.

10. The differential of claim 7, wherein a connecting portion width of each of the first bridge connecting portion and the second bridge connecting portion at the first undercut radius section and the second undercut radius section is less than a width of the bridge.

11. The differential of claim 7, wherein the first spring central location of the first leaf spring is centrally located at the first bridge connecting portion and the second leaf spring central location is at the centrally located at the second bridge connecting portion.

12. The differential of claim 7, further comprising:
a flyweight plate; and
a back-drive coil to selectively position the flyweight plate to control rotation of the roller cage assembly in relation to the clutch cam housing to prevent the roller cage assembly from advancing from the neutral position.

13. The differential of claim 7, further comprising:
an armature plate; and
an overrunning clutch electromagnetic coil configured to selectively control the position of the armature plate to prevent the roller cage assembly from moving in relation to the clutch cam housing to prevent the roller cage assembly from retarding from the neutral position.

14. A vehicle comprising:
a motor to provide engine torque;
a transmission in operational communication to receive the engine torque;
a rear differential in operational communication with the transmission;
a pair of rear wheels in operational communication with the rear differential;
a pair of front wheels; and
a front differential to selectively couple torque between the transmission and at least one front wheel of the pair of front wheels, the front differential including, a ring gear positioned within a housing of the front differential being in operational communication with a pinion, the pinion in operational communication with the transmission,
an overrunning clutch, the overrunning clutch including,
a clutch cam housing including a central passage, an inside surface of the clutch cam housing that defines the central passage includes spaced cam features, a rotation of the clutch cam housing lock to a rotation of the ring gear within the housing;
a roller cage,
a plurality of rollers positioned within windows of the roller cage, the plurality of rollers including a first set of rollers engaging an outside surface of a first portion of a first side hub and a second set of rollers engaging an outside surface of a first portion of the second side hub, and
a plurality of roller spring members positioned to engage the plurality of rollers within the windows of the roller cage, each roller spring member including,
a first leaf spring,
a second leaf spring positioned in a parallel configuration with the first leaf spring,
a bridge,
a first bridge connecting portion coupling the bridge to a first spring central location of the first leaf spring, and
a second bridge connecting portion coupling the bridge to a second spring central location of the second leaf spring, each roller spring member including at least one of,
each of the first bridge connecting portion and the second bridge connecting portion including a first undercut radius section and a second undercut radius section that are symmetrically located to spread out a transition in stiffness
each of the first leaf spring and the second leaf spring being tapering from an associated one of the first spring central location of the first leaf spring and the second leaf spring central location of the second leaf spring to a first end and a second end of each one of the first leaf spring and the second leaf spring, and
each of the first leaf spring and the second leaf spring including a straight portion, the straight portion being proximate the associated one of the first spring central location and the second spring central location of the first leaf spring and the second leaf spring; and
a centering spring engaging the clutch cam housing and the roller cage to position each roller of the plurality of rollers in a central location within an associated cam feature of the spaced cam features in the inside surface of the clutch cam housing to place the bi-directional overrunning clutch in a neutral position.

15. The vehicle of claim 14, wherein the roller cage includes support pillar portions that form at least in part the windows of the roller cage, at least some of the support pillar portions including a groove, the bridge of each roller spring member received in the groove of an associated support pillar to position an associated first leaf spring and associated second leaf spring of the roller spring member in associated windows of the roller cage to engage associated rollers.

16. The vehicle of claim 14, wherein the tapering of the first leaf spring and the second leaf spring provides a center height at the respective first spring central location and the second spring central location that is greater than an end height of the first end of and the second end of each of the first leaf spring and the second leaf spring.

17. The vehicle of claim 14, wherein a connecting portion width of each of the first bridge connecting portion and the second bridge connecting portion at the first undercut radius section and the second undercut radius section is less than a width of the bridge.

18. The vehicle of claim 14, further comprising:

a flyweight plate; and a back-drive coil to selectively position the flyweight plate to control rotation of the roller cage in relation to the clutch cam housing to prevent the overrunning clutch from advancing from the neutral position.

19. The vehicle of claim 14, further comprising:

an armature plate; and an overrunning clutch electromagnetic coil configured to selectively control a position of the armature plate to prevent the roller cage from moving in relation to the clutch cam housing to prevent the bi-directional overrunning clutch from retarding from the neutral position.

* * * * *